(12) United States Patent
Giraud et al.

(10) Patent No.: US 8,815,137 B2
(45) Date of Patent: Aug. 26, 2014

(54) METHOD FOR INCORPORATING AN ANTI-COUNTERFEITING DEVICE INTO A MULTI-WALLED CONTAINER AND THE MULTI-WALLED CONTAINER CONTAINING SUCH DEVICE

(75) Inventors: Jean-Pierre Giraud, Paris (FR); Michael Bucholtz, Balston, NY (US); John Belfance, Amsterdam, NY (US)

(73) Assignee: CSP Technologies, Inc., Amsterdam, NY (US)

( * ) Notice: Subject to any disclaimer, the term of this patent is extended or adjusted under 35 U.S.C. 154(b) by 1322 days.

(21) Appl. No.: 12/561,941

(22) Filed: Sep. 17, 2009

(65) Prior Publication Data

US 2010/0066502 A1 Mar. 18, 2010

Related U.S. Application Data

(63) Continuation of application No. PCT/US2008/057527, filed on Mar. 19, 2008.

(60) Provisional application No. 60/895,639, filed on Mar. 19, 2007.

(51) Int. Cl.
  *B29C 45/14* (2006.01)
  *F17C 1/02* (2006.01)
  *G08B 13/14* (2006.01)

(52) U.S. Cl.
  USPC ... 264/275; 264/279.1; 220/586; 220/592.26; 340/572.8

(58) Field of Classification Search
  None
  See application file for complete search history.

(56) References Cited

U.S. PATENT DOCUMENTS

| 3,302,813 A | 2/1967 | Schaich |
| 3,341,644 A | 9/1967 | Allen |
| 5,275,277 A | 1/1994 | Gallegos |
| 6,889,455 B2 | 5/2005 | Giraud |
| 2007/0166517 A1 | 7/2007 | Fukui et al. |

FOREIGN PATENT DOCUMENTS

| EP | 0 762 356 | 3/1997 |
| EP | 1 419 977 | 5/2004 |
| JP | 2002102310 | 4/2002 |
| JP | 2003263620 | 9/2003 |

(Continued)

OTHER PUBLICATIONS

International Preliminary Report on Patentability corresponding to International Patent Application Serial No. PCT/US2008/057527, mailed Oct. 1, 2009.

(Continued)

*Primary Examiner* — Steven Lim
*Assistant Examiner* — Omeed Alizada
(74) *Attorney, Agent, or Firm* — David B. Gornish

(57) ABSTRACT

A method of incorporating an anti-counterfeiting device into a multi-walled container is provided. The multi-walled container includes an inner wall having an outer surface, an outer wall adjacent to the inner wall, and an anti-counterfeiting device sandwiched between the inner and outer walls. The method includes forming the inner wall from a polymeric composition, adhering the anti-counterfeiting device to the outer surface of the inner wall either during, or after formation of the inner wall, and then over molding the outer wall about the inner wall to form the multi-walled container. Suitable anti-counterfeiting devices for incorporation into the multi-walled container include RFID, printed or foil antennae, conductive inks, metal spheres, and x-ray readable foils.

31 Claims, 4 Drawing Sheets

(56) References Cited

FOREIGN PATENT DOCUMENTS

| | | |
|---|---|---|
| JP | WO2004027738 | 4/2004 |
| JP | 2005263288 A | 9/2005 |
| WO | 2001 00493 | 1/2001 |
| WO | WO2005097604 | 10/2005 |
| WO | WO2006010141 | 1/2006 |
| WO | 2008 34469 | 3/2008 |

OTHER PUBLICATIONS

European Patent Office, Communication pursuant to Article 94(3) EPC, in Application No. 08 744 079.8-1253, dated Jan. 7, 2013. (8 pages).

METHOD FOR INCORPORATING AN ANTI-COUNTERFEITING DEVICE INTO A MULTI-WALLED CONTAINER AND THE MULTI-WALLED CONTAINER CONTAINING SUCH DEVICE

RELATED APPLICATIONS

This application is a continuation of International Application Serial No. PCT/US2008/057257 (International Publication No. WO 08/116,005), having an International filing date of Mar. 19, 2008. This PCT application claims priority to U.S. Provisional Patent Application Ser. No. 60/895,639 filed on Mar. 19, 2007. The entire specifications of the PCT and provisional applications referred to above are hereby incorporated by reference.

FIELD OF THE INVENTION

The present technology relates to methods of incorporating anti-counterfeiting devices into multi-walled containers. More particularly, the present technology relates to methods for incorporating anti-counterfeiting devices into multi-walled containers during the manufacturing process for the container, and the multi-walled containers containing such anti-counterfeiting devices.

BACKGROUND OF THE INVENTION

There is an increasing need to protect high value consumer products from being counterfeited. One method to insure the supply chain from product manufacturing through retail sale is to authenticate the product throughout the supply chain. Most counterfeiting occurs in the distribution chain at the wholesaler and distribution points. The track and trace requires item level identification.

One example of authentication that is being implemented in the pharmaceutical industry is referred to as e-pedigree. An e-pedigree is an electronic record that accompanies each pharmaceutical product from point of manufacturing to point of sale. Radio frequency identification devices (RFID's) may be applied to each unit package to facilitate authentication. The RFID's provide a means to read and write information to each unit package. The hardware and software infrastructure required in the supply chain to enable RFID technology is costly and sophisticated. The infrastructure is a significant barrier to widespread use of RFID technology for authentication.

Other, lower cost identification technologies such as bar-codes, 2-D bar-codes are available that provide a read-only capability. These devices are generally lower cost and require less sophisticated infrastructure. However, bar-codes typically are located on the outside of the package to be read and therefore are more easy to counterfeit.

Non-visual authentication methods are needed that: (1) are reliable, (2) tamper evident, and (3) can be seamlessly integrated into the package.

SUMMARY OF THE INVENTION

An aspect of the present technology is a method of incorporating an anti-counterfeiting device into a multi-walled container. The multi-walled container has an inner wall with an outer surface and an outside wall adjacent to the outside surface of the inner wall. An anti-counterfeiting device is incorporated during the manufacturing of the multi-walled container such that the anti-counterfeiting device is sandwiched between the inner wall and the outer wall.

In one embodiment of the present technology, the multi-walled container is made by injection molding a polymeric composition to form the inner wall of the container. The anti-counterfeiting device is adhered to the outer surface of the inner wall either after molding the inner wall or during molding of the inner wall. The inner wall with the adhered anti-counterfeiting device is then placed into a mold cavity for the outer wall and the outer wall is over molded about the inner wall to form a multi-walled container having an anti-counterfeiting device sandwiched between the inner and outer walls.

In an alternative embodiment, the multi-walled container is made by extruding a polymeric composition into a film. The film is formed into a tube-like structure or sleeve which forms the inner wall of the container. The anti-counterfeiting device is adhered to the film either prior to or after the film is formed into the tube-like structure. The tube is placed into the mold cavity for the outer wall and the outer wall is over molded about the tube to form a multi-walled container having an anti-counterfeiting device sandwiched between the inner and outer walls.

Another aspect of the invention is a multi-walled container having an anti-counterfeiting device incorporated therein. Various anti-counterfeiting devices suitable for use in the multi-walled container include RFID, printed or foil antennas, conductive inks, metal spheres, and x-ray readable foils. Because the anti-counterfeiting device is located between the walls or layers of the multi-walled container, the device cannot easily be tampered with.

DETAILED DESCRIPTION OF THE INVENTION

Figure 1:
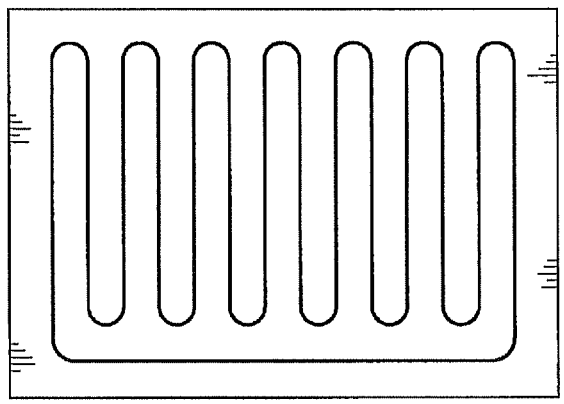
FIG. 1 illustrates one embodiment of an anti-counterfeiting device which is incorporated into a multi-walled container.

The present technology describes methods for incorporating anti-counterfeiting devices into multi-walled or layered containers. These containers are made of thermoplastic resins and may be used for pharmaceutical, medical devices and medical diagnostic products. In accordance with the present technology, the anti-counterfeiting device is located between one or more of the walls or layers in the container. The device is inserted between the container walls during the manufacturing process.

Once the device is placed between the container walls, the device may be interrogated in a non-contact manner using a variety of sensing technologies. These technologies include, but are not limited to: (1) RFID, (2) IR, (3) conductivity, (4) induction, (5) microwave, etc.

A reader, when placed in close proximity to the container, interrogates the anti-counterfeiting device. Depending on the type of device, information may be read and written to the device.

The multi-walled container comprises an outer wall defining a storage space in which an item or items can be stored. The outer wall is composed of a thermoplastic resin. Suitable thermoplastic resins for forming the outer wall of the container include: polyethylene, polypropylene, polyvinylidene chloride, polyethylene vinyl acetate, polystyrene, polycarbonate, polyester terephthalate, polybutylene, metallocene catalyzed polyolefins, and polymaleic anhydride. The preferred resins are polypropylene and polyethylene. The thickness of the outer wall ranges from 0.5-2.0 mm thickness, more preferably 0.6-1.0 mm thick.

The multi-walled container has an inner wall that is disposed within the storage space defined by the outer wall and is adjacent to the outer wall. The inner wall may be made of an active polymer composition that absorbs or releases a gas. In one embodiment, the active polymer composition incorporates a desiccant. Suitable desiccants include, but are not limited to, silica gel, molecular sieve, calcium carbonate and naturally occurring clay compounds, including, but not limited to montmorillonite clay.

In another embodiment, the desiccant composition includes one or more desiccant plastic compositions comprising formulations that are used to mold shaped articles. Such desiccant plastic compositions can comprise 2-phase and/or 3-phase compositions. A 2-phase composition is one that comprises a desiccant and a base polymer. A 3-phase composition is one that comprises a desiccant and at least 2 immiscible base polymers. In one embodiment of the present invention, the loading of the desiccant can range from about 10% to about 80% by weight of the polymer, alternatively about 30% to about 70% by weight of the polymer.

In another embodiment, the base polymer is selected from a group of thermoplastics that include polyolefins—polyethylene (LDPE, LLDPE, HDPE) and polypropylene may be used. Suitable 3-phase desiccant entrained plastic compositions include, but are not limited to, the desiccant plastics disclosed in one or more of the following U.S. Pat. Nos. 5,911,937, 6,214,255, 6,130,263, 6,080,350 and 6,174,952, 6,124,006, and 6,221,446. These references are incorporated herein by reference. Varying the desiccant loading and channeling agent in the plastic formulation can control the overall moisture capacity and uptake rate of the desiccant entrained plastic. Desiccant compositions, as described above, are available from CSP Technologies of Auburn, Ala.

The multi-walled containers can be manufactured using a variety of methods. For example, in one embodiment, the multi-walled container is made using an over molding process. In this method, the inner wall or sleeve is injection molded. The sleeve can be cylindrical or tube-shaped with an open top and open bottom. Alternatively, the sleeve can have a molded base and sidewalls and open at the top only.

The molded sleeve is placed on the core of the container mold and plastic material to form the outer wall of the container is then injection molded over the sleeve. The resultant container is a molded article with an injection molded inner wall and an injection molded outer wall. The container may be molded using one or more molding machines.

In another embodiment, the multi-walled container is made using a film sleeve process. Using this method, the inner wall is made by extruding a polymer film. The polymer film is die cut to a size that matches the inner circumference and height of the desired container. The polymer film can range in thickness from about 0.05 mm to about 0.8 mm thick, preferably from about 0.3 mm to about 0.6 mm thick. The cut film pieces are rolled into a tubular shape and joined together to form a freestanding tube (or sleeve). The film can be joined using, for example, an adhesive, or heat staking or sonic welding processes. The sleeve is cylindrical shaped with an open top and open bottom.

The film sleeve is placed on the core of the container mold. In one embodiment, the placement of the sleeve on the mold core is performed via a robotic arm. The film sleeve is held in place in the mold by conventional methods known in the art, such as suction or charging the film with static electricity or any combination of methods. Subsequently, the mold closes and plastic is then injection molded over the sleeve to form the outer wall of the multi-walled container. The mold then opens and the molded multi-walled container is ejected with the film sleeve attached to the molded outer wall. Further details and alternative embodiments for forming the film sleeve and subsequently molding the outer wall of the container are described in International Patent Application No. WO 03/013843, entitled "Method and Composition for an In-Mold Liner," which is hereby incorporated by reference in its entirety. The resultant container is a molded article with an inner wall formed from an extruded film and an injection molded outer wall.

Figure 2:
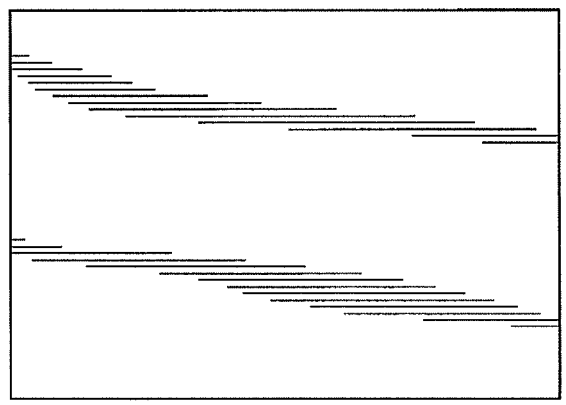
FIG. 2 illustrates another embodiment of an anti-counterfeiting device which is incorporated into a multi-walled container.
Figure 3:
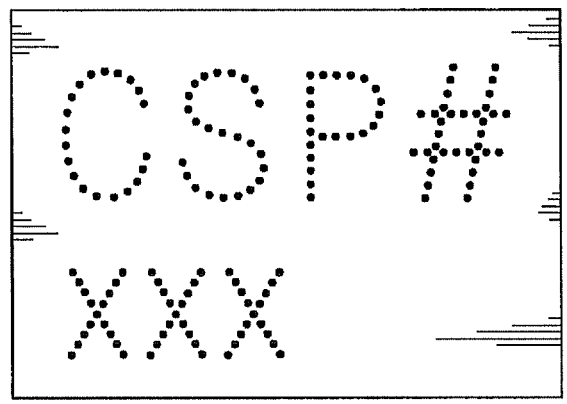
FIG. 3 illustrates another embodiment of an anti-counterfeiting device which is incorporated into a multi-walled container.

A variety of anti-counterfeiting devices can be incorporated into the multi-walled containers disclosed herein. For example, one anti-counterfeiting device which can be utilized is a printed or foil-shaped antenna, such as the printed antenna illustrated in FIG. 1. This device may be printed using conductive ink or die cut from a metal foil, preferably aluminum foil. Alternatively, the antenna could be a foil sheet or a foil material perforated with a particular pattern, as illustrated in FIGS. 2 and 3, respectively. A unique antenna shape or pattern can be used for each container.

Figure 4:
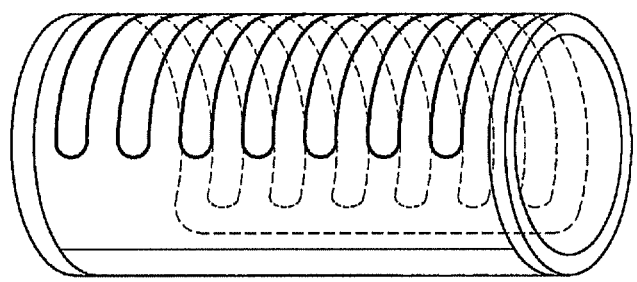
FIG. 4 is a perspective view of the inner wall of the multi-walled container having an anti-counterfeiting device adhered thereto.

The antenna is placed on the outside surface of the inner wall, as shown in FIG. 4. The antenna may be directly printed on the outside surface of the inner wall or placed on a label that in turn is affixed to the outside surface of the inner wall. The antenna may be interrogated with radio waves. In one embodiment, the radio wave is in the FM band. An FM receiver or mobile telephone can be used to send and receive signals from the antenna. Each container will have a unique response for a given input signal. In a further embodiment, varying the radio transmission properties of the container outer wall may change the response signal. This may be accomplished by varying the conductive properties of the material or the thickness of the plastic in the outer wall.

A further alternative for the anti-counterfeiting device is to utilize conductive ink or metal spheres. The ink is printed on a label which can be applied to the outer surface of the inner wall. The metal spheres may be incorporated into a carrier substrate, such as, for example, a label which is also applied to the outer surface of the inner wall. The conductive ink or metal spheres may be organized in a pattern to uniquely identify the container. The conductive material is interrogated using a metal detector.

Another anti-counterfeiting device that can be utilized is a foil shape readable by x-ray. The foil has a shape or pattern, for example a perforation pattern, in a specific location that can be seen in an x-ray image of the container. For example, the letters "VALID" could be cut into a piece of foil so that the x-ray image reveals the word when validated.

Figure 5:
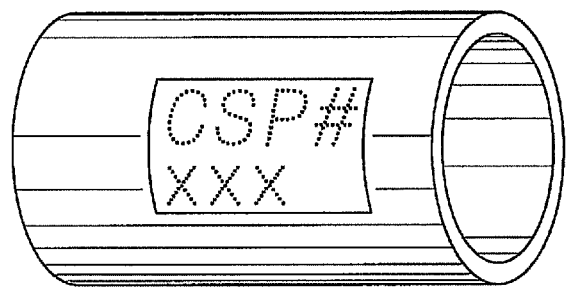
FIG. 5 is a perspective view of the inner wall of the multi-walled container having another embodiment of an anti-counterfeiting device adhered thereto.

Another alternative, illustrated in FIG. 5, is a RFID inlay which comprises an antenna and a silicon chip. The inlay is typically supplied on a continuous roll. The inlay may be die cut, for example a die cut label, and applied to the outside surface of the inner wall of the container.

Figure 6:
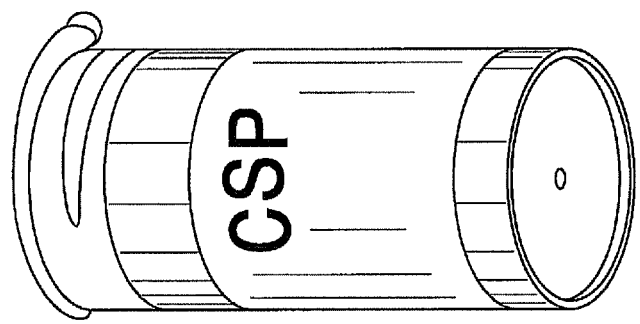
FIG. 6 is a perspective view of the multi-walled container which includes an outer sleeve incorporating a tuning antenna.
Figure 7:
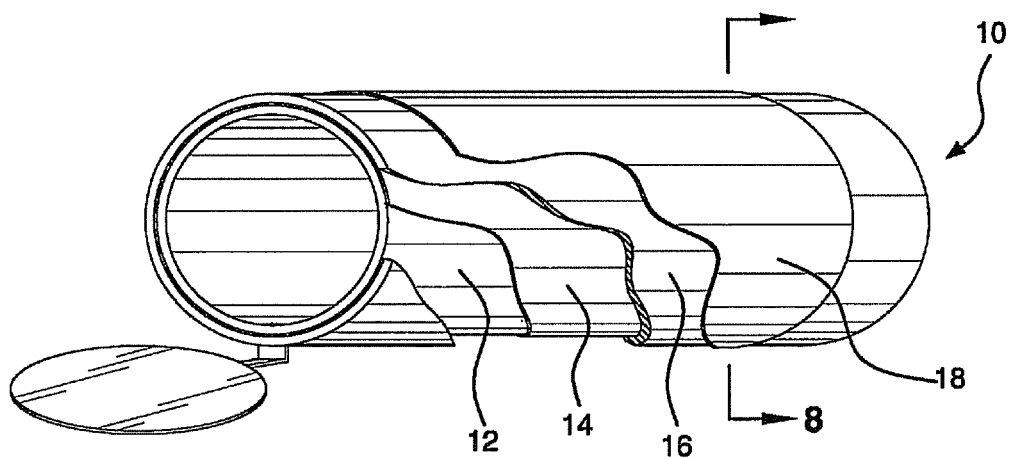
FIG. 7 is a cut away view of a multi-walled container employing an anti-counterfeiting antenna adhered to the inner wall and a tuning antenna positioned on the outer wall.
Figure 8:
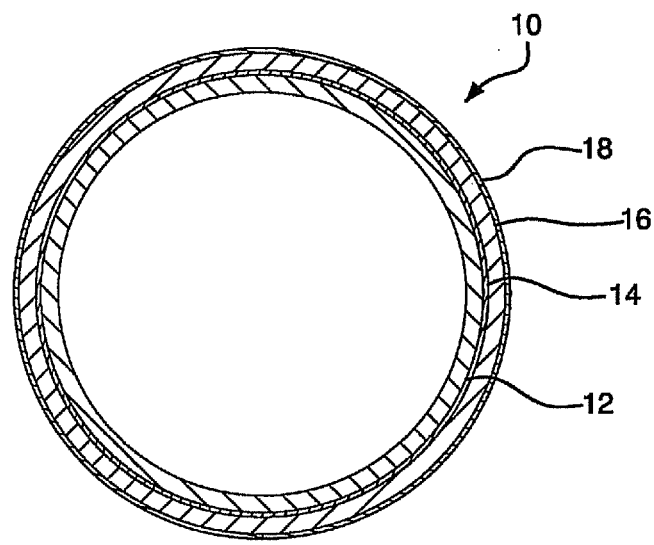
FIG. 8 is a cross-sectional view of the multi-walled container of FIG. 7.

In another embodiment, illustrated in FIGS. 6-8, a multi-walled container 10 has an inner wall 12 that has an antenna 14 adhered to the outer surface of the inner wall 12. An outer wall 16 is molded over the inner wall 12 so that the antenna 14 is sandwiched between the inner wall 12 and the outer wall 16. A label 18, such as a printed label, is then applied to the outer wall 16 of the container 10 after filling. Alternatively, the label 18 can be placed into the mold cavity for the outer wall and then the outer wall 16 is molded so that the label 18 is adhered to the outer wall 16 during the manufacturing process. The printed label acts as a "tuning label" to cancel out or amplify the signal from the antenna 14 adhered to the inner wall 12 of the container to provide a unique identification for a particular product type. The tuning label uses resonance to make the container sensitive to one radio frequency.

The embodiment in FIGS. 6-8 is different from the embodiments in FIGS. 1-5—because in FIGS. 6-8, the working device (the antenna+the tuning label) is assembled during the container molding process to create a working anti-counterfeiting device. In FIGS. 1-5, all of the anticounterfeiting devices are operational as stand alone devices before being molded into the container. The anticounterfeiting components illustrated in FIGS. 6-8, however, exist as non-functioning components until assembled into the container during the molding process. Once assembled into the container, the antenna and tuning label work with a separate device that sends out radio waves of a specific frequency range that can be picked up by the container's antenna. The container, along with its outside label, is designed to act as a tuner to "tune" the radio frequency sent by the source. By using different tuning labels and different container wall thicknesses, wall shapes, etc., there are infinite output signal possibilities.

The separate device broadcasts a signal at the specific frequency range to which the container has been tuned. The container responds to this signal by emitting sound waves or vibrations. The sound waves or vibrations can be read by an anti-counterfeit reader, which can be the same device that broadcasts the signal or a separate reader device. If tampering to the outer label or container has occurred, the container will not respond to the broadcast signal.

The method of manufacturing the multi-walled container to incorporate an anti-counterfeiting device will now be described in further detail.

In one embodiment, the inner wall is formed by an injection molding process in which a polymeric composition is injected into a closed mold cavity. The anti-counterfeiting device is incorporated into the multi-walled container either prior to molding the inner wall or after the inner wall is molded. When the anti-counterfeiting device is incorporated prior to molding, the anti-counterfeiting device is first placed into the mold cavity of the inner wall. Preferably, the device is in the form of a label that includes a substrate material that is comprised of a polymer that is compatible with the inner wall polymeric composition so that the label adheres to the inner wall. The device is placed into the mold cavity such that the device adheres to the outer surface of the inner wall after molding.

Once the device is placed in the mold cavity, the mold is closed and the inner wall polymeric composition is injected into the mold cavity to form the inner wall. The mold then opens and the molded part is ejected with the anti-counterfeiting device adhered to the outer surface. The molded inner wall is then placed into a mold cavity for the outer wall, either on the same molding machine or on a separate molding machine. The mold cavity is closed and the polymeric composition for the outer wall is injected into the mold cavity to over mold the outer wall around the inner wall. The resulting multi-walled container has the anti-counterfeiting device sandwiched between the outer wall and the inner wall of the container. If an outer tuning label is desired to be provided to the container, it can be applied to the outer wall of the container after molding, using, for example, an adhesive to secure the tuning label to the container. Alternatively, it can be placed along with the molded inner wall into the mold cavity for the outer wall. The polymeric composition for the outer wall is then injected into the mold cavity to over mold the outer wall with the tuning label adhered to the outer wall.

When the anti-counterfeiting device is incorporated after the inner wall of the container is molded, the device is applied to the outer surface of the inner wall using, for example, an adhesive label or another type of adhesive to secure the device to the outer surface. The anti-counterfeiting device can be applied either prior to ejecting the inner wall from the core of the molding machine or alternatively, after the inner wall has been ejected from the mold (post molding). The molded inner wall with the adhered anti-counterfeiting device is then placed into the mold cavity for the outer wall, and the outer wall is over molded around the inner wall, as discussed above, to form the multi-walled container.

In another embodiment, the inner wall of the container is formed by a film sleeve process, rather than an injection molded process. In the film sleeve process, a polymeric composition is extruded into a polymeric film which is used to form the inner wall of the container. Preferably, the film is cut, such as by die-cutting, into an appropriate shape and size to form the inner wall. The cut film is formed into a tube-like shape or sleeve with an open bottom and an open top. The ends of the film are secured into the tub or sleeve shape using, for example, an adhesive, heat staking or sonic welding. Alternatively, the film could be extruded in the form of a tube-like shape, rather than cutting and forming the tube. In this alternative, the continuous tube from the extruder is cut to conform to the size of the desired container.

The anti-counterfeiting device is adhered to the cut film prior to forming the film into the tube-like structure or, alternatively, the device can be adhered to the outer surface of the film after the film has been formed into the tube or sleeve. The anti-counterfeiting device is applied to the film by an adhesive label or other adhesive that will adhere the anti-counterfeiting device to the film.

After the film has been formed into the tube or sleeve, the tube or sleeve is placed onto the core of an injection molding machine and the mold cavity is closed. The polymer composition for forming the outer wall of the container is injected into the mold cavity to over mold the outer wall around the inner wall tube or sleeve containing the anti-counterfeiting device. The resulting multi-walled container has the anti-counterfeiting device sandwiched between the inner and outer walls of the container.

The invention has now been described in such full, clear, concise and exact terms as to enable any person skilled in the art to which it pertains to practice the same. It is to be understood that the foregoing describes preferred embodiments and examples of the invention, and that modifications may be made therein without departing from the spirit or scope of the invention as set forth in the claims.

What is claimed is:

1. A method for incorporating an anti-counterfeiting device into a molded multi-walled container wherein the multi-walled container comprises an inner sleeve having an outer surface, and an outer wall surrounding the inner sleeve, the method comprising the steps of:
    (a) inserting an inner sleeve composition within a mold to form the inner sleeve of the container;
    (b) adhering an anti-counterfeiting device to the outer surface of the inner sleeve;
    (c) injection molding an outer wall composition over the inner sleeve and the anti-counterfeiting device to form the outer wall of the container and sandwich the anti-counterfeiting device between the inner sleeve and the outer wall of the container.

2. The method of claim 1, wherein the anti-counterfeiting device is inserted into the mold prior to inserting the inner sleeve composition and the inner sleeve is injection molded so that the anti-counterfeiting device adheres to the outer surface of the inner sleeve.

3. The method of claim 1, wherein the inner sleeve composition is injection molded to form the inner sleeve of the container and the anti-counterfeiting device is applied to the outer surface of the inner sleeve prior to or after removing the inner sleeve from the mold.

4. The method of claim 1, wherein the anti-counterfeiting device comprises a label and a substrate material, and the substrate material is comprised of a polymeric material that is compatible with the inner sleeve composition.

5. The method of claim 1, wherein the inner sleeve composition is extruded into a film and the film is cut and formed into a free-standing tubular structure which is inserted into the mold to form the inner sleeve of the container.

6. The method of claim 1, wherein the anti-counterfeiting device is an antenna.

7. The method of claim 6, wherein the antenna is printed using conductive ink.

8. The method of claim 6, wherein the antenna is formed from a foil material.

9. The method of claim 8, wherein the foil material is perforated or shaped.

10. The method of claim 6, wherein the antenna is placed on a label.

11. The method of claim 1, wherein the anti-counterfeiting device comprises a RFID.

12. The method of claim 1, wherein the anti-counterfeiting device comprises a label printed with conductive ink.

13. The method of claim 1, wherein the anti-counterfeiting device comprises conductive metal spheres incorporated into a carrier substrate.

14. The method of claim 1, wherein the anti-counterfeiting device comprises a foil readable by x-ray.

15. The method of claim 1, wherein a label comprising a tuner is applied to the outer wall of the container during or after the wall is molded.

16. The method of claim 15, wherein the label amplifies or cancels a signal from the anti-counterfeiting device.

17. A molded multi-walled container including an anti-counterfeiting device comprising:
    a container outer wall formed from a molded polymeric material and defining a storage space in which an item can be stored;
    a container inner sleeve provided within the storage space defined by the container outer wall, said container inner sleeve being formed from a molded or extruded polymeric composition that is inserted within a mold and having an outer surface adjacent the container outer wall, the molded polymeric material of the container outer wall being injection molded over the container inner sleeve; and
    an anti-counterfeiting device adhered to the outer surface of the inner sleeve so that the anti-counterfeiting device is sandwiched between the inner sleeve and the outer wall.

18. The container of claim 17, wherein the anti-counterfeiting device comprises a label and a substrate material, and the substrate material is comprised of a polymeric material that is compatible with the inner sleeve polymeric composition.

19. The container of claim 17, wherein the anti-counterfeiting device is an antenna.

20. The antenna of claim 19, wherein the antenna is printed using conductive ink.

21. The antenna of claim 19, wherein the antenna is formed from a foil material.

22. The antenna of claim 21, wherein the foil material is perforated or shaped.

23. The antenna of claim 19, wherein the antenna is placed on a label.

24. The container of claim 17, wherein the anti-counterfeiting device comprises a RFID.

25. The container of claim 17, wherein the anti-counterfeiting device comprises a label printed with conductive ink.

26. The container of claim 17, wherein the anti-counterfeiting device comprises conductive metal spheres incorporated into a carrier substrate.

27. The container of claim 17, wherein the anti-counterfeiting device comprises a foil readable by x-ray.

28. The container of claim 17, wherein a label comprising a tuner is applied to the outer wall of the container.

29. The container of claim 28, wherein the label amplifies or cancels a signal from the anti-counterfeiting device.

30. A molded multi-walled container having a RFID inlay, comprising:
    a container outer wall formed from a molded polymeric material and defining a storage space;
    a container inner wall provided within the storage space, the container inner wall being formed from a molded or extruded polymeric composition that is inserted within a mold and having an outer surface adjacent to the container outer wall, the molded polymeric material of the container outer wall being injection molded over the container inner wall; and
    a RFID inlay housed between the inner wall and the outer wall.

31. The container of claim 30, wherein the RFID inlay is adhered to the outer surface of the container inner wall.

* * * * *